United States Patent [19]

Biber

[11] Patent Number: 4,459,689
[45] Date of Patent: Jul. 10, 1984

[54] MULTIPLE ZONE OBJECT DETECTION SYSTEM

[75] Inventor: Conrad H. Biber, Needham, Mass.

[73] Assignee: Polaroid Corporation, Cambridge, Mass.

[21] Appl. No.: 334,735

[22] Filed: Dec. 28, 1981

[51] Int. Cl.³ .............................................. G01S 15/06
[52] U.S. Cl. ..................................... 367/107; 367/93; 367/112; 367/96
[58] Field of Search ................. 367/112, 116, 93, 107, 367/96

[56] References Cited

U.S. PATENT DOCUMENTS

| | | | |
|---|---|---|---|
| 3,321,737 | 5/1967 | Russell | 367/116 |
| 3,522,764 | 8/1970 | Biber et al. | 95/44 |
| 3,757,285 | 9/1973 | Ferré | 367/112 X |
| 4,186,371 | 1/1980 | Toubkin et al. | 367/112 X |
| 4,199,246 | 4/1980 | Muggli | 354/195 |
| 4,280,204 | 7/1981 | Elchinger | 367/116 |

Primary Examiner—Richard A. Farley
Attorney, Agent, or Firm—John J. Kelleher

[57] ABSTRACT

Apparatus utilizing a combination energy transmitting and energy receiving transducer or a transducer set consisting of separate energy transmitting and energy receiving transducers, are employed to detect and subsequently indicate the presence of an object(s) within one or more of a plurality of spaced-apart spacial zones.

7 Claims, 4 Drawing Figures

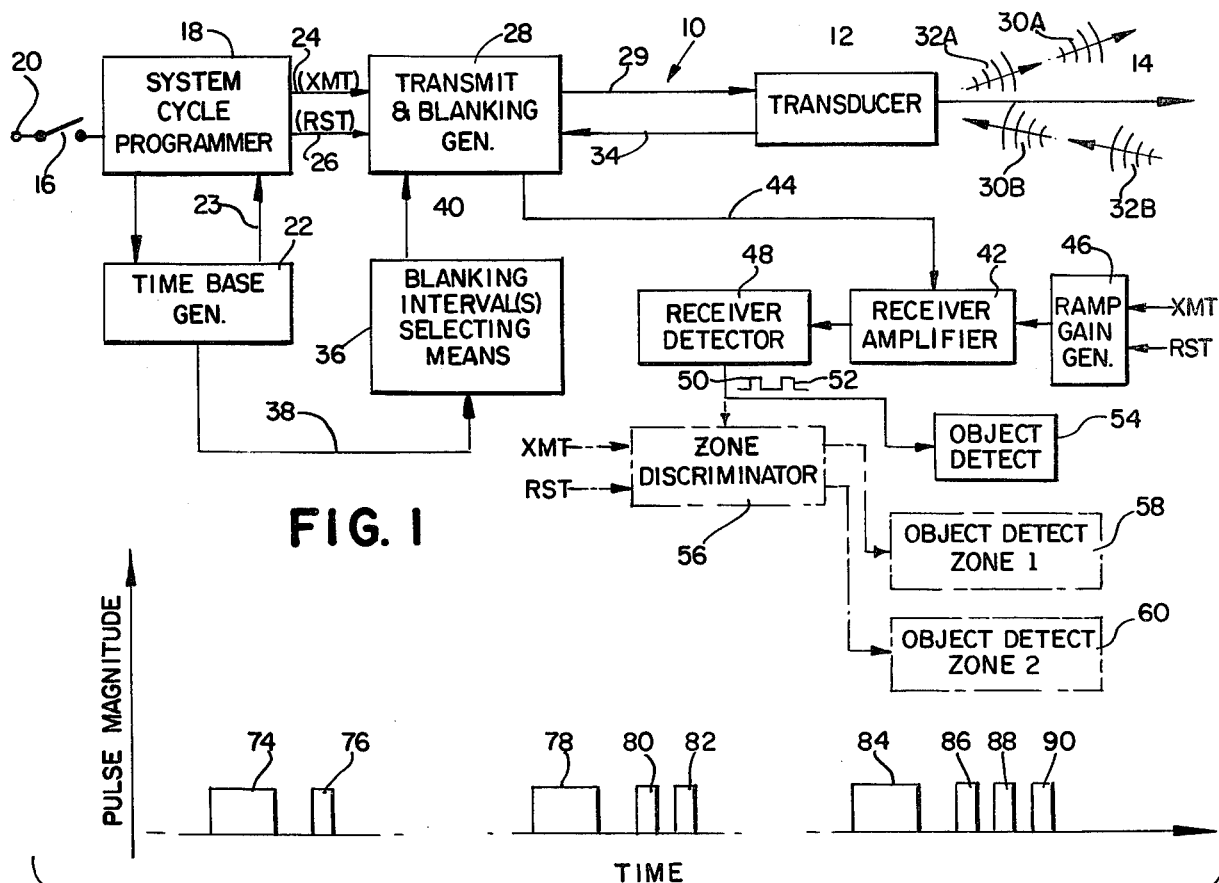
FIG. 1
FIG. 2
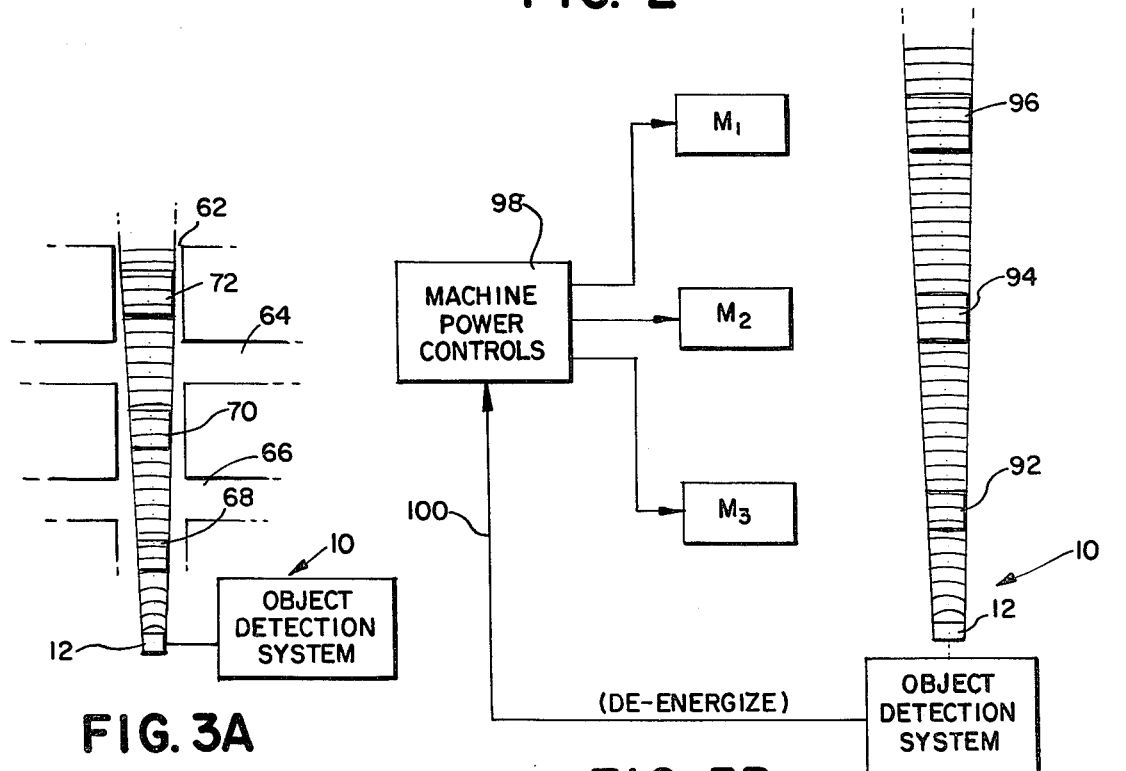
FIG. 3A
FIG. 3B

MULTIPLE ZONE OBJECT DETECTION SYSTEM

BACKGROUND OF THE INVENTION

1. Field of the Invention

The present invention relates to object detection apparatus, in general, and to apparatus for sequentially detecting the presence of objects within a plurality of spaced-apart zones, in particular.

2. Description of the Prior Art

Apparatus incorporating acoustical or electromagnetic means for detecting distant objects are well known and understood in the prior art. Electromagnetic means such as radar, photoelectric devices and the like as well as acoustical devices utilizing ultrasonics have often been employed to detect remote objects or both detect such objects, and subsequently initiate some action or sequence of actions in response to their presence within a particular space or zone.

Ultrasonic and photoelectric intrusion alarm systems, such as those employed to protect personal property within a dwelling from unauthorized intruders, for example, are also well-known in the prior art. When such alarm systms are employed to detect the presence of an intruder within a plurality of separate or spaced-apart zones, present practice is to utilize a single energy-transmitting and receiving transducer, or a single set of energy-transmitting and receiving transducers for each space or zone wherein an intruder is sought to be detected. An example of a single energy-transmitting and receiving transducer incorporated in a mobility cane for the blind is shown in U.S. Pat. No. 4,280,204 to ELCHINGER. An example of a single set of energy transmitting and receiving transducers (one transducer for transmitting energy and the other for detecting an echo of same) incorporated in an automatically focusing camera, is shown in my U.S. Pat. No. 3,522,764.

Providing a plurality of transducers or transducer sets for each space or zone sought to be monitored or protected produces a number of disadvantages. Among these disadvantages are the increase in the amount of equipment necessary to construct an object detection or alarm system, the increased space required to locate and mount said additional equipment, the increased complexity of installing such a system and the increase in system equipment costs.

SUMMARY OF THE INVENTION

In accordance with the teachings of the present invention, an object detection system is disclosed that is capable of sequentially detecting objects within a plurality of spaced-apart spaces or zones and subsequently indicating that an object is within one or more of said zones. The detection system includes means for periodically transmitting and receiving a burst of object detecting energy. In its transmit mode of operation, the receive portion of said object detection system is blanked or disabled while the transmit portion transmits a burst of object detecting energy toward the object(s) to be detected. In its receive mode of operation, the receive portion of said object detection system is unblanked or enabled for the periods of time corresponding to the times required to receive a reflection of said energy from an object(s) within any of said zones and is blanked at all other times.

BRIEF DESCRIPTION OF THE DRAWINGS

FIG. 1 is a block diagram schematically describing the object detection apparatus of the present invention.

FIG. 2 is a graph of a series of energy pulses that are transmitted as a function of time and possible reflections of said pulses from objects detected by said energy pulses.

FIG. 3A is a schematic diagram showing the object detection system of the present invention monitoring three spaced-apart spacial zones within a system of passageways.

FIG. 3B is a schematic diagram showing the object detection system of the present invention monitoring spacial zones adjacent each of three production machines.

DESCRIPTION OF THE PREFERRED EMBODIMENTS

Referring now to the drawings, and specifically to FIG. 1, a block diagram schematically describing object detection apparatus 10 of the present invention, is depicted. Detection apparatus 10 includes combination transmitting and receiving, capacitance-type electrostatic transducer 12. Transducer 12 transmits and receives a directional, multiple lobe pattern of ultrasonic object-detecting energy whose contours are fairly well understood in the prior art. The multiple lobe transducer pattern of a transducer with a circular backplate of 3.5 cm in diameter consists of a single central lobe having a lobe angle of approximately 12° at its half power point ($-3$ dB) when operated at a frequency of 50 KHz and a plurality of substantially smaller side lobes with all said lobes being generally symmetrical about main or central axis of transmission 14 of said transducer 12. Transducer lobe angle may be changed by either changing transducer operating frequency or by changing the diameter of said circular backplate. This capacitance-type transducer multiple lobe pattern is described in much greater detail in U.S. Pat. No. 4,199,246, issued Apr. 22, 1980, to J. MUGGLI and in an article by W. KUHL, et al. entitled "Condenser Transmitters and Microphones with Solid Dielectric Airborn Ultrasonics" in Acustica, Vol. 4, 954, pages 519–532.

In order to cause transducer 12 to transmit bursts of ultrasonic energy toward a plurality of spaced apart spacial zones for the purpose of detecting the presence of objects within said zones power switch 16 must be closed in order to cause electrical power to be applied to system cycle programmer 18 and to other electrical components of object detection system 10 from a suitable source of electrical power (not shown) connected to electrical terminal 20. When power is applied to programmer 18 and to other detection system components, said programmer 18 divides-down the high frequency output pulses from crystal oscillator or time base generator 22 that are routed to said programmer 18 through path 23, into a transmit and reset pulse train having the same pulse repetition frequency but shifted in phase from one another. Transmit pulses produced at programmer output 24 are designated XMT. Reset pulses produced at programmer output 26 and designated RST are the same as the XMT pulses in height and width but are delayed with respect to said XMT pulses by about 200 ms which is greater than the round trip time needed for sonic energy to travel from transducer 12 to remote objects and return, under normal conditions of temperature and pressure, for objects at a distance of approximately 50 ft. from said ultrasonic transducer 12. This arrangement will allow any echo from an object within 50 ft. of said transducer 12 to be received in the time interval between successive RST pulses or before a subsequent XMT pulse.

Transmit and blanking generator 28 to which the XMT and RST pulses are applied operates in a manner similar to the corresponding components in the above-cited MUGGLI patent which is to cause transducer 12 to transmit periodic bursts of ultrasonic energy pulses by means of a signal produced by said generator 28 on path 29. Two of said energy pulses are illustrated at 30A and 32A and echoes of said transmitted energy pulses are illustrated at 30B and 32B, respectively. In addition to its transmit function, transmit and blanking generator 28 blocks or blanks receive signals produced by transducer 12 from object detecting echoes of each transmit pulse, signals that would appear on path 34 during various intervals of time if an object or objects should be detected. In other words, during the blanking interval, echo signals produced by transducer 12 are prevented from moving much beyond said path 34. The duration of the unblanked intervals of time correspond to the widths of the spaced-apart or spacial zones within which an object is sought to be detected and the blanked intervals of time correspond to the spaces between or adjacent said spacial zones. These blanked and unblanked intervals of time are selectively established by blanking interval selecting means 36 which is coupled to time base generator 22 through path 38 and to transmit and blanking generator 28 through path 40.

During the intervals of time when echo signals are not blanked by transmit and blanking generator 28, said echo signals are routed to receiver amplifier 42 through path 44. Receiver amplifier 42 has a ramp gain characteristic that is controlled by ramp gain generator 46 to increase the sensitivity of object detection system 10 to more distant objects. Ramp gain change is initiated by ramp gain generator 46 upon receipt of an XMT pulse from programmer 18 and said ramp gain change is terminated upon the receipt of an RST pulse from said programmer 18. The output of amplifier 42 is detected by receiver detector 48 to (for example) produce echo pulses 50 and/or 54 such that the time between a transmit pulse XMT and a particular echo pulse is proportional to the distance between an object in a particular spacial zone and object detection system 10. This particular time and distance relationship is dependent upon the speed of sound and is a relationship that is necessary in order to be able to establish the width of each desired spacial zone.

While an ultrasonic burst of energy is being generated by transducer 12 in response to transmit and blanking generator 28, the input to receiver amplifier 42 is clamped at a fixed potential to prevent the simultaneous generation of false receive pulses by receiver detector 48 which is connected to transducer 12 through said generator 28. The clamp is removed so that an echo of the ultrasonic energy that was transmitted while said clamp was applied can be detected. This clamp is alternately applied and removed during the appropriate portions of each transmitted and received ultrasonic energy burst.

The object detection system may be configured to produce object detection signal 54 whenever an object is detected during any unblanked interval of time. In this situation, object detect signal 54 would be generated if either echo pulse 50 or 52 were produced by receiver detector 48. An alternate configuration would be the addition of zone discriminator 56. Zone discriminator 56 distinguishes between the spacial zones within which objects are sought to be detected and, for example, generates object detect zone 1 signal 58 and object detect zone 2 signal 60 for two of such zones when an object is detected within both of said zones. Zone discrimination is initiated by zone discriminator 56 upon receipt of an XMT pulse from programmer 18 and is terminated upon receipt of an RST pulse from said programmer 18 for each burst of ultrasonic energy transmitted by transducer 12. If an object of objects are detected in, for example, each of two spacial zones resulting in the generation of echo pulses 50 and 52, zone discriminator 56 will generate object detect zone 1 signal 58 and object detect zone 2 signal 60, respectively, when said echo pulse 50 and 52 are applied to zone discriminator 56 after an XMT pulse has caused transducer 12 to transmit a burst of ultrasonic energy and after this same XMT pulse has been applied to zone discriminator 56.

The object detection apparatus of the present invention may be employed in any number of different environments. One such environment is shown in drawing FIG. 3A which is a system of interconnecting passageways wherein intruders are sought to be detected if they should penetrate any one of three particular spacial zones within said system of passageways. With reference to FIG. 3A, the system of passageways consists, in part, of longitudinal passageway 62 and transverse passageways 64 and 66. Object detection system 10 is mounted such that transducer 12 can transmit periodic bursts of ultrasonic energy along the length of said passagway 62. Blanking interval selecting means 36 (FIG. 1) is designed or may be adjusted to create spacial zones 68, 70 and 72. Persons entering zones 68, 70 and 72 would be detected by detection system 10, whereas other persons could freely pass along transverse passgeways 64 or 66 without being detected by said detection system 10. A typical ultrasonic energy pulse transmission and echo signal pattern is shown in drawing FIG. 2. With reference to both FIGS. 2 and 3A, a burst of ultrasonic energy is transmitted toward spacial zones 68, 70 and 72 by transducer 12 for the duration of ultrasonic energy transmission pulse 74. If an object or person penetrated zone 68 during the time said energy was traversing said zone 68, echo pulse 76 would be generated by receiver detector 48. Detection system 10 would include zone discriminator 66 and therefore said echo pulse 76 would be applied to zone discriminator 56, causing said discriminator 56 to generate a zone 68 object detect signal. Similarly, if energy pulse 78 traversed zones 68 and 70 in corridor 62 while a person or object was present therein, echo pulse 80 and 82 would be generated by receiver detector 48 and subsequently applied to the input of discriminator 56 causing said discriminator 56 to generate zone 68 and zone 70 object detection signals. Finally, if energy pulse 84 traversed zones 68, 70 and 72 in corridor 62 while a person or object was present therein, echo pulses 86, 88 and 90 would be generated by receiver detector 48 and subsequently applied to the input of discriminator 56, causing said discriminator 56 to generate zone 68, zone 70 and zone 72 object detection signals.

Another possible environment for the object detection apparatus of the present invention is shown in drawing FIG. 3B. In drawing FIG. 3B, three seprate spacial zones adjacent three production machines are monitored, for safety purposes, to prevent unauthorized personnel from being injured by said machines. In this context, transducer 12 directs pulses of ultrasonic energy toward protective or spacial zones 92, 94 and 96. Protective zone 92 is adjacent machine $M_1$, protective zone 94 is adjacent machine $M_2$ and protective zone 96 is adjacent machine $M_3$. Object detection system 10 in FIG. 3B would include zone discriminator 56 and would operate in essentially the same way as it operates in the passageway monitoring arrangement described above with respect to FIG. 3A. If, for example, a person or persons entered protective zones 92, 94 or 96 during the time ultrasonic energy transmitted by transducer 12 was traversing said zones, an object detect signal or signals would be generated by object detection system 10 for the particular zone or zones penetrated. The object detect signal or signals generated by object detection system 10 for the zone or zones penetrated by such a person would be routed to production machine power controls 98 through path 100. Depending upon the zone penetrated, object detection system 10 would cause power to the production machine adjacent a penetrated zone to be interrupted. If all three zones were penetrated, all three machines would be de-energized. However, if only one protective zone was penetrated, only that machine adjacent said penetrated protective zone would be de-energized.

GENERAL CONSIDERATIONS

When describing the transmit and blanking generator of the present invention, the term "blanking" was described herein as limiting the receive signal generated by transducer 12 to more or less the vicinity of path 34 to prevent said receive signal from being applied to receiver amplifier 42. Another method of achieving receive signal blanking would be to prevent said receive signal from generating an object detect signal such as object detect signal 54 any time after the generation of the transducer receive signal on path 34 and before the generation of an object detect signal. A visual or or aural indication, for example, that an object had been detected could be suppressed during a blanked interval. A combination of receive signal and object detect signal blanking could also be employed. The term "blanked" or "blanking" as employed herein includes all such arrangements.

The preferred embodiment of the present invention describes an object detection system that either monitors or protects three spacial zones that are approximately the same size and are approximately the same distance from one another. Blanking interval selecting means 36 can readily be constructed (or adjusted) to increase the number of zones, and/or change their size (width) and spacing with respect to one another.

It will be apparent to those skilled in the art from the foregoing description of my invention that various improvements and modifications can be made in it without departing from its true scope. The embodiments described herein are merely illustrtive and should not be viewed as the only embodiments that might encompass my invention.

What is claimed is:
1. Intrusion monitoring apparatus comprising:
   a fixedly positioned source for transmitting a burst of energy in the direction to be monitored;
   means for indicating detection of reflection of said energy from objects located within given minimum and maximum distances along said direction; an
   means for precluding operation of said detection indicating means for reflections from objects located within one or more selected zones between said minimum and maximum distances so as to provide at least two object detection zones of fixed distance from said source with an interposed selected zone thereby permitting intrusion into or passage of objects through each of said selected zones without indication of detection while providing an indication of intrusion of objects into the remaining object detection zones.

2. The apparatus of claim 1 wherein said energy is sonic energy.

3. The apparatus of claim 2 wherein said direction undergoing monitoring is intersected by one or more transverse passageways and said precluding means is operative to preclude operation of said detection indicating means for reflections from objects in, or traversing the intersections while permitting detection of intrusions in areas along said direction outside of said intersections.

4. The apparatus of claim 3 wherein the direction undergoing monitoring includes a plurality of machines spaced apart alongside the axis of said direction and said precluding means is operative to preclude detection of objects in portions of the spacing between said machines to allow passage therebetween while permitting detection of objects within protective zones closely adjoining each machine.

5. The apparatus of claim 4 including control means for separately rendering each of said machines inoperative, and means responsive to said detection indicating means for rendering a respective machine inoperative in response to detection of an object within the protective zone adjoining that machine.

6. A method of monitoring selected areas comprising the steps of:
   transmitting a burst of sonic energy from a fixed point in a direction towards the areas to be monitored;
   detecting and indicating reception of an echo from objects located within given minimum and maximum distances along the transmission direction while precluding at least indication of an echo from objects located within one or more selected zones along said direction between said given minimum and maximum distances so as to provide at least two detection zones with an interposed selected zone to thereby permit intrusion into or passage of objects through said selected zones without such indication of detection while providing an indication of any object intrusion into the remaining object detection zone.

7. The method of claim 6 wherein the monitoring direction is intersected by one or more transverse passageways and said precluding step includes precluding any indication of echos from objects in or traversing the intersections while permitting indication of intrusions in a given direction in areas which lie outside of the said select zone.

* * * * *